United States Patent [19]
Lee

[11] Patent Number: 5,508,747
[45] Date of Patent: Apr. 16, 1996

[54] FRAME FORMAT CONVERSION DEVICE FOR CONVERTING IMAGE SIGNAL FRAME THROUGH FRAME INTERPOLATION

[75] Inventor: Dong H. Lee, Seoul, Rep. of Korea

[73] Assignee: Goldstar Co., Ltd., Seoul, Rep. of Korea

[21] Appl. No.: 286,556

[22] Filed: Aug. 5, 1994

[30] Foreign Application Priority Data

| Aug. 6, 1993 | [KR] | Rep. of Korea | 15289/1993 |
| Aug. 7, 1993 | [KR] | Rep. of Korea | 15367/1993 |
| Aug. 7, 1993 | [KR] | Rep. of Korea | 15430/1993 |
| Aug. 18, 1993 | [KR] | Rep. of Korea | 16031/1993 |

[51] Int. Cl.$^6$ ........................ H04N 7/13
[52] U.S. Cl. ............ 348/441; 348/451; 348/407; 348/443; 348/469
[58] Field of Search ................... 348/441, 451, 348/452, 407, 412, 469, 458, 424, 408, 409, 420, 415, 22, 19, 154, 155, 431, 459, 440, 446, 445, 416, 402, 911, 443; H04N 7/13

[56] References Cited

U.S. PATENT DOCUMENTS

| 4,989,091 | 1/1991 | Lucas | 348/458 |
| 5,006,931 | 4/1991 | Shirota | 348/408 |
| 5,025,482 | 6/1991 | Murakami et al. | 348/461 |
| 5,036,393 | 7/1991 | Samad et al. | 348/416 |
| 5,117,288 | 5/1992 | Elsenhardt et al. | 348/409 |
| 5,193,003 | 3/1993 | Kondo | 348/409 |
| 5,357,282 | 10/1994 | Lee | 348/403 |

Primary Examiner—James J. Groody
Assistant Examiner—Nina N. West
Attorney, Agent, or Firm—Finnegan, Henderson, Farabow, Garrett & Dunner

[57] ABSTRACT

A device for converting image signal frame format including a motion compensator for restoring image signals by carrying out motion compensations employing motion information, variable length decoding, inverse multiplex conversion, displaced frame difference, inverse quantization, and inverse discrete cosine conversion. A first frame ratio convertor is used for classifying areas by pixels and converting frame ratios of image signals received from the motion compensator according to the classified areas. The device provides users with the advantage of natural display pictures having good picture quality by carrying out classification of the corresponding pixel areas and subsequent interpolation utilizing various informations applied from an image signal decoder.

32 Claims, 8 Drawing Sheets

(n)th frame (n+1)th frame

FRAME FORMAT CONVERSION DEVICE FOR CONVERTING IMAGE SIGNAL FRAME THROUGH FRAME INTERPOLATION

FIELD OF THE INVENTION

This invention relates to a device for converting image signal frame formats, more particularly to a device for converting frame ratios through frame interpolation.

BACKGROUND OF THE INVENTION

In general, digital transmission of image signals requires high compression. For example transmission methods of image signals include H.261 for teleconferencing, MPEG I for multimedia, MPEG II for multipurpose use such as digital TV, and a compression method for HDTV, all of which employ, for high compression, a method for compressing through compensation of motion so as to eliminate duplication existing on time base.

In order to raise compression ratio of H.261 and MPEG I, dissemination is carried to lower the frame ratio for coding, other than the method for compression through compensation of motion as explained above. That is, compression is carried out with a lowered frame ratio of 25 Hz or 30 Hz.

However, even though transmission is carried out compressed with a lowered frame ratio to 25 Hz to 30 Hz, the compressed signals should be converted into signals with a frame ratio of 50 Hz or 60 Hz for final display on a monitor.

To accommodate film modes with a frame ratio of 24 Hz or 30 Hz, film mode signals compressed to a frame ratio 24 Hz or 30 Hz for transmission should be converted into signals with a frame ratio of 60 Hz to facilitate displaying on a monitor at the final display stage.

SUMMARY OF THE INVENTION

An object of the present invention is a device for converting image signal frame format.

A further object of the present invention is a device for converting frame ratios through classification of areas by pixels, and carrying out compensation of motion and averaging interpolation according to the classified areas.

These and other objects and features of this invention can be achieved by providing a device for converting image signal frame format including a motion compensation means for restoring image signals by carrying out motion compensations employing motion information, variable length decoded and inverse multiplex converted, and displaced frame difference, variable length decoded and inverse multiplex converted, inverse quantized and inverse discrete cosine converted, and a first frame ratio conversion means for classifying areas by pixels employing the motion information, variable length decoded and inverse multiplex converted, macroblock type information and the displaced frame difference, variable length decoded and inverse multiplex converted, inverse quantized and inverse discrete cosine converted, and for converting frame ratios of image signals received from the motion compensation means according to the classified areas.

BRIEF DESCRIPTION OF THE DRAWINGS

The manner by which the above and other objects of the present invention are attained will be fully apparent from the following detailed description when considered in view of the drawings wherein.

DETAILED DESCRIPTION OF THE INVENTION

Details of this invention is to be explained hereinafter, referring to attached drawings.

Figure 1:
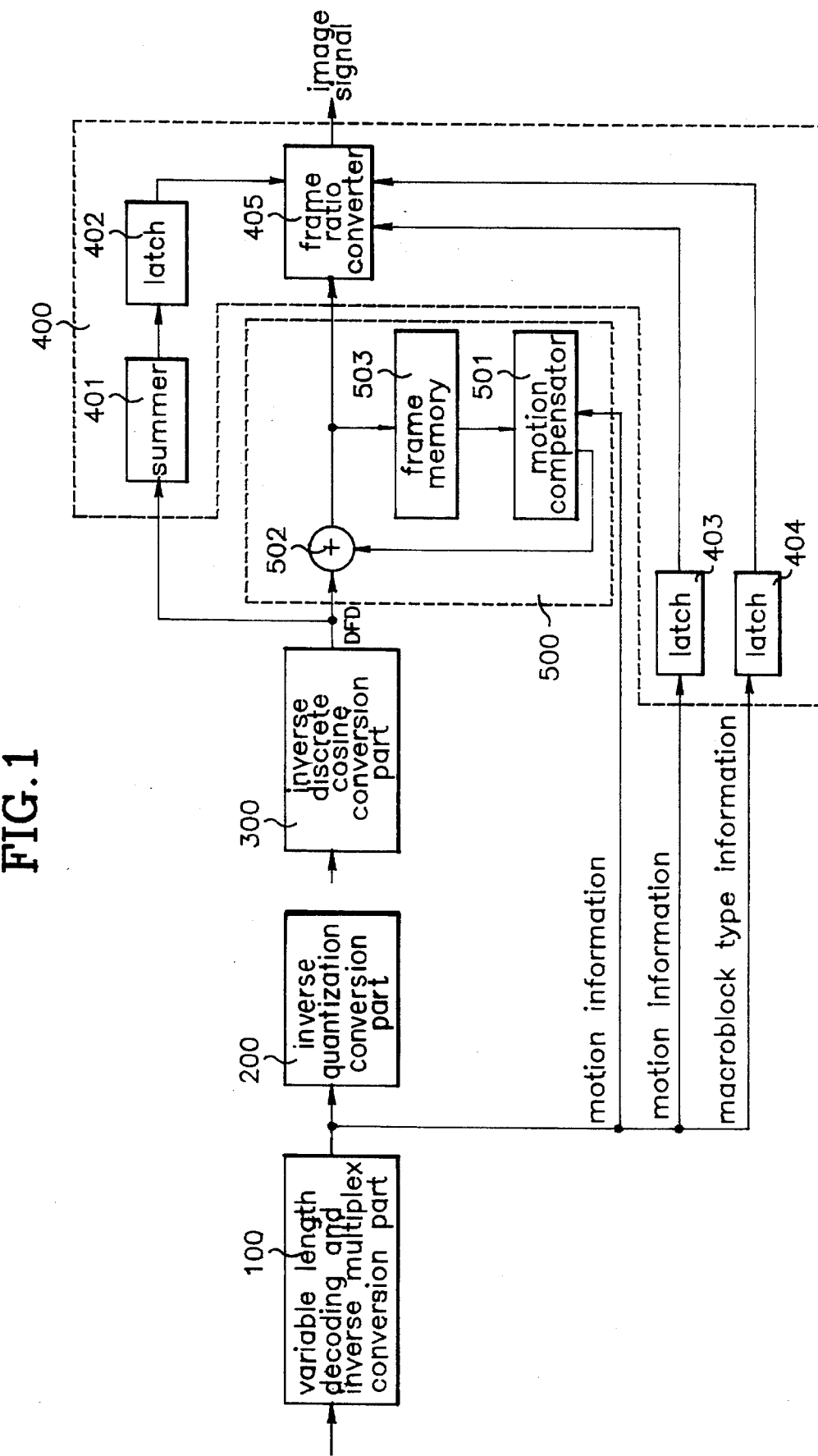
FIG. 1 is a block diagram of a device for converting image signal frame ratios in accordance with the present invention.

As shown in FIG. 1, a device for converting frame formats in accordance with the present invention includes a variable length decoding and inverse multiplex conversion part 100, an inverse quantization conversion part 200, a inverse discrete cosine conversion part 300, a motion compensation part 500, and a frame ratio conversion part 400 for converting frame ratios of image signals.

The variable length decoding and inverse multiplex conversion part 100 restores an incoming compressed bit stream to meaningful signals by carrying out variable length decoding, and classifies it into motion information, macroblock type information, quantum conversion coefficient and control parameters by carrying out inverse multiplex conversion.

The inverse quantization conversion part 200 carries out an inverse quantization conversion according to the quantum conversion coefficient received from the variable length decoding and inverse multiplex conversion part 100, and the inverse cosine conversion part 300 generates displaced frame difference (DFD) based on motion ratio estimation by carrying out an inverse cosine conversion of the inverse quantization converted signals at the inverse quantization conversion part 200.

The motion compensation part 500 restores image signals by carrying out motion compensation using the motion information, variable length decoded inverse quantization converted, and received from the variable length decoding and inverse quantization conversion part 100, and the DFD signals that have been variable length decoded, inverse multiplexed, inverse quantized, and inverse discrete cosine converted by the variable length decoding and inverse multiplex conversion part 100, the inverse quantization conversion part 200, and the inverse cosine conversion part 300.

The frame ratio conversion part 400 classifies the image signal areas into still areas, motion compensation areas, covered areas and uncovered areas classified by pixels using the motion information, variable length decoded and inverse multiplexed, macroblock type information, and the DFD signals received from, and variable length decoded and inverse multiplexed, inverse quantized, and inverse discrete cosine converted, and converts the frame ratios of the image signals received from the motion compensation part 500 according to the classified areas.

Figure 2A:
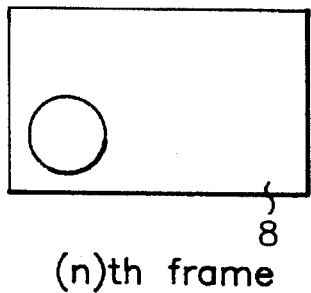
FIGS. 2a, 2b, and 2c show area markings of pixels classified in accordance with the present invention.
Figure 2B:
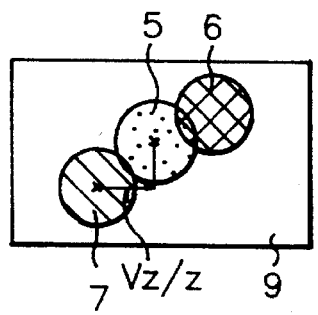
Figure 2C:
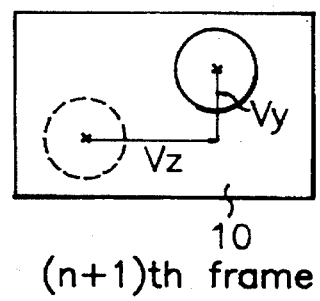

One frame 9 to be subjected to interpolation is classified into still areas, motion compensation areas, covered areas and uncovered areas by pixels, which classified areas have, as shown in FIGS. 2a–2c still areas having no changes between front and rear frames (n)th and (n+1)th, i.e., between adjoining two frames 8 and 9, motion compensation areas 5 for which motion compensation must be carried out due to the existence of motion, covered areas 7 appearing as the motion part moves, and uncovered areas 6 that become covered as the motion part moves.

Details of the motion compensation part 500 and the frame ratio conversion part 400 will now be explained.

The motion compensation part 500 includes a motion compensator 501 for compensating motion using the motion information, variable length decoded and inverse multiplex converted at the variable length decoding and inverse multiplex conversion part 100, an adder 502 for adding the DFD signals received from, and variable length decoded and inverse multiplex, inverse quantized and inverse discrete cosine converted at the variable length decoding and inverse multiplex conversion part 100, inverse quantization conversion part 200 and inverse discrete cosine conversion part 300, and signals received from and motion compensated by the motion compensator 501, and for transmitting the image signals to the frame conversion part 400, and a frame memory 503 for storing image signals received from the adder 502 for the motion compensation of the next frame and for transmitting the stored image signals to the motion compensator 501.

One embodiment of the frame ratio conversion part 400 includes a summer 401 for summing up the DFD signals in macroblock units received from, and variable length decoded and inverse multiplexed, inverse quantized and inverse discrete cosine converted by the variable length decoding and inverse multiplex conversion part 100, the inverse quantization conversion part 200 and the inverse discrete cosine conversion part 300. A latch 402 temporarily stores the DFD signals received from the summer 401 in macroblock units, a latch 403 for temporarily storing the motion information received from, and variable length decoded and inverse multiplex converted by the variable length decoding and inverse multiplex conversion part 100 in order to compensate for the delay of the summer 401. A latch 404 temporarily stores the macroblock type information received from, and variable length decoded and inverse multiplex converted by the variable length decoding and inverse multiplex conversion part 100 in order to compensate for the delay at the summer 401. A frame ratio converter 405 converts frame ratios by forming one frame through classifying areas by pixels utilizing the image signals received from the motion compensation part 500 and signals received from the latches 402, 403, and 404, and carrying out corresponding interpolations according to the result of the classification.

The compressed bit stream applied to the variable length decoding and inverse multiplex conversion part 100 is restored to meaningful signals by undergoing variable length decoding, and is classified into motion information, macroblock type information, quantum conversion coefficient and control parameters by undergoing inverse multiplex conversion, at the variable length decoding and inverse multiplex conversion part 100. The control parameters transmitted from the variable length decoding and inverse multiplex conversion part 100 to the inverse quantization conversion part 200 are converted into inverse quantization at the inverse quantization conversion part 200 according to the quantum conversion coefficient received from the variable length decoding and inverse multiplex conversion part 100. The signals converted into inverse quantization undergoes inverse discrete cosine conversion at the inverse discrete cosine conversion part 300 restoring the DFD signals based on estimated motion path of the image.

Image signals of the front frame stored in the frame memory 503 undergo motion compensation by the motion compensator 501 according to the motion information received from the variable length decoding and inverse multiplex conversion part 100, which is, combined with the DFD signals received from the inverse discrete cosine conversion part 100 at the adder 502. This produces image signals that are transmitted to the frame ratio converter 405 and stored in the frame memory 503.

The image signals transmitted from the adder 502, which comprises mostly image signals having a frame ratio of 25 Hz or 30 Hz, are converted into image signals with twice the frame ratio of 50 Hz or 60 Hz in order to be displayed on a monitor.

To do this, the DFD signals that have undergone variable length decoding and inverse multiplex, inverse quantization and inverse discrete cosine conversion through the variable length decoding and inverse multiplex conversion part 100, the inverse quantization conversion part 200 and the inverse discrete cosine conversion part 300 are summed up into macroblock units and temporarily stored in the latch 402.

The motion information that has undergone variable length decoding and inverse multiplex conversion by the variable length decoding and inverse multiplex conversion part 100 is temporarily stored in the latch 403 in order to compensate for the delay introduced by the summer 401. The macroblock type information that has undergone variable length decoding and inverse multiplex conversion in the variable length decoding and inverse multiplex conversion part 100 is stored in the latch 404 temporarily in order to compensate for the delay introduced by the summer 401.

Figure 3:
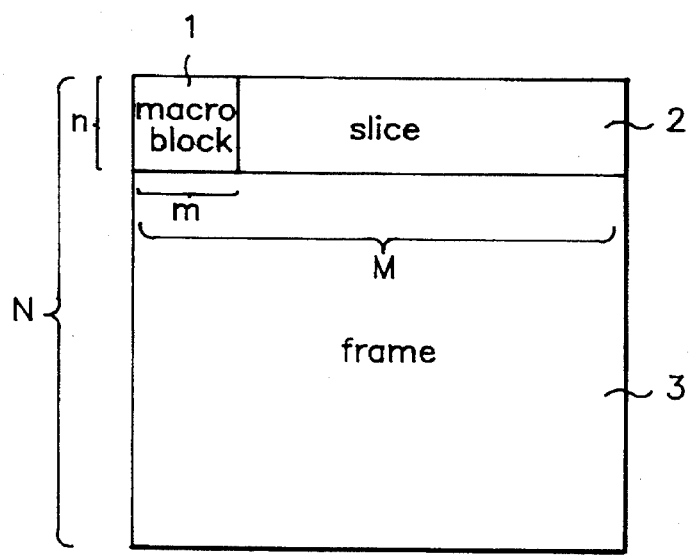
FIG. 3 shows a basic unit for coding.

As shown in FIG. 3, the basic unit for coding is a macroblock 1 which has m ✢n pixels. M/m macroblocks makes one slice 2, and one slice has n×M pixels. N/n slices 2 makes one frame 3. Since one frame has M×N pixels, one frame has (N/n)×(M/m) blocks.

To know the ratio of change between frames, signals coded and transmitted in macroblock units should be waited until they are piled up to make one frame. This is the reason why the DFD signals received from the inverse discrete cosine conversion part 300 should be gathered in macroblock units in the summer 401, and the latches 403 and 404 are required to compensate for the delay of time for the gathering.

The signals transmitted from the latches 402, 403, and 404 to the frame ratio converter 405 are used for classifying into still areas, motion compensation areas, covered areas and uncovered areas at the frame ratio converter 405, based on which required interpolation can be carried out at the frame ratio conversion part 405 using the image signals received from the motion compensation part 500.

Figure 4:
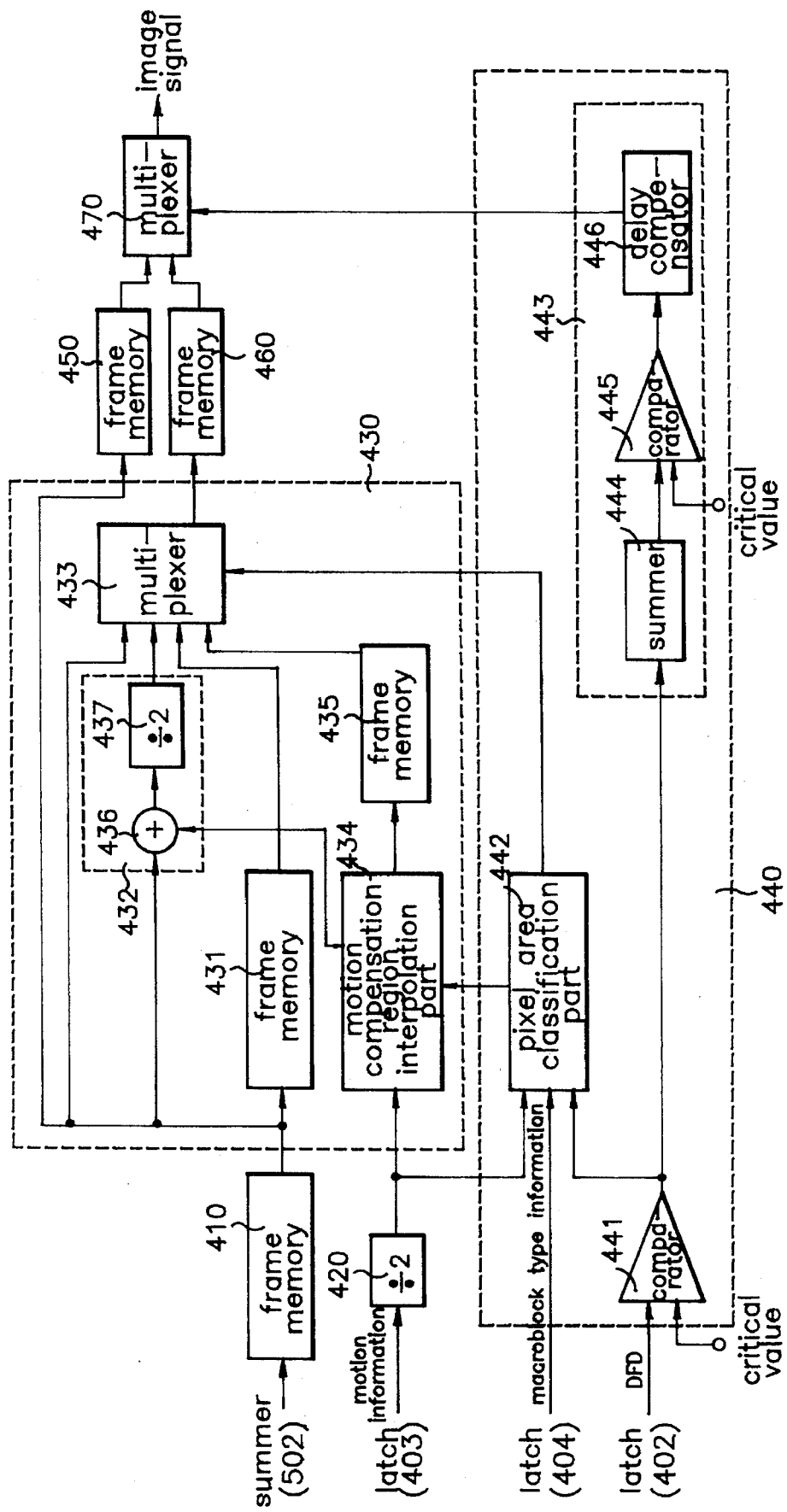
FIG. 4 shows details of the frame ratio converter of the device of FIG. 1.

Details of the frame ratio converter 405 is to be explained hereinafter, referring to FIG. 4.

As shown in FIG. 3, the frame ratio converter 405 includes a frame memory 410 for storing image signals received from the motion compensation part 500, a divider 420 for dividing the motion information received from the latch 403 by 2, a interpolation control part 440 for classifying pixels into still areas, motion compensation areas, covered areas and uncovered areas classified using signals received from the latches 402 and 404 and the divider 420. An interpolation part 430 for carrying out interpolation to complete one frame using image signals received from the frame memory 410 and signals received from the divider 420 under the control of the compensation control cart 440, a frame memory 450 for temporary storing the image signals received from the frame memory 410 to match the synchronization, a frame memory 460 for temporary storing the image signals received from the interpolation part 430 to match the synchronization, and a multiplexer 470 for selecting and transmitting one of the image signals received from the frame memories 450 and 460 under the control of the compensation control part 440.

The frame memory 450 and 460 may be removed making the multiplexer 470 to select and transmit one of the signals received from the frame memory 410 and the compensation part 430, directly.

The interpolation control part 440 includes a comparator 441 for comparing the DFD signals received from the latch 402 to a preset critical value, a pixel area classification part 442 for controlling the interpolation part 430 classifying into still areas, motion compensation areas, covered areas and uncovered areas by pixels using signals received from the divider 420. The latch 404 and the comparator 441, and a scene change detection part 443 control output of the multiplexer 470 to detect changes of scenes using signals received from the comparator 441. The scene change detection part 443 includes a summer 444 for summing signals received from the comparator 441 in frame units, a comparator 445 for comparing the signals received from the summer 444 to a critical value, and a delay compensator 446 for compensating for the delays by storing signals received from the comparator 445 temporarily, and for controlling the output of the multiplexer 470.

The interpolation part 430 includes a frame memory 431 for storing the image signals received from the frame memory 410, an averaging interpolation part 432 for carrying out interpolation with the average of two frames using the image signals received from the frame memories 410 and 431, and a motion compensation region interpolation part 434 for carrying out motion compensation using signals received from the frame memory 431 and the divider 420 under the control of the pixel area classification part 442. A frame memory 435 for storing signals received from the motion compensation region interpolation part 434, and a multiplexer 433 for selecting and transmitting signals received from the frame memories 410, 431 and 435 and the averaging interpolation part 432 under the control of the pixel area classification part 442.

The averaging interpolation part 432 includes an adder 436 for adding the image signals received from the frame memories 410 and 431, and a divider 437 for dividing signals received from the adder 436 by 2.

Operation of the frame ratio converter 405 having the foregoing structure is to be explained hereinafter, referring to FIGS. 5a–5g.

The image signals B transmitted from the adder 502 of the motion compensation part 500 are stored into the frame memory 410 in frame units according to the input frame clock A. The image signals C stored in the frame memory 410 in frame units are stored in the frame memory 431, again. The image signals stored in the frame memories 410 and 431 in frame units are for adjoining two frames, e.g., for front and rear frames (n+1)th and (n)th.

The image signals stored in the frame memories 410 and 431 are added in the adder 436 and divided by 2 in the divider 437 to become average values between two frames.

Figure 5A:
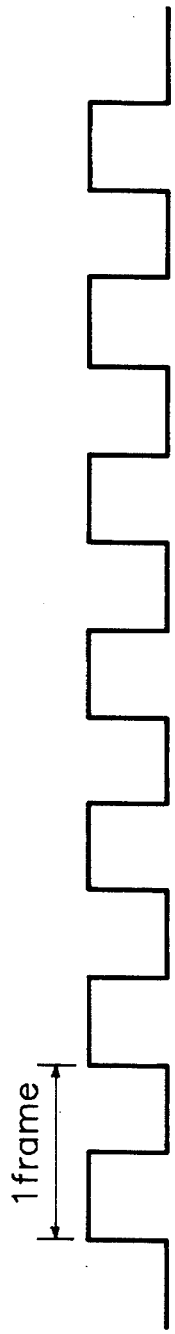
FIGS. 5a through 5g show signal wave patterns for explanation of the device of FIG. 4.
Figure 5B:
Figure 5C:
Figure 5D:
Figure 5E:

The motion information received from the latch 403 of the frame conversion part 400 is divided by 2 at the divider 420 to become an average value between two frames, and transmitted to the motion compensation region interpolation part 434 and the pixel area classification part 442. The average motion information received from the divider 420 is used for carrying out motion compensation of the image signals received from the frame memory 431 at the motion compensation region interpolation part 434 under the control of the pixel area classification part 442. The image signals (FIG. 5d) D having been motion compensated by the motion compensation region interpolation part 434 after being stored in the frame memory 435 temporarily, are transmitted to the multiplexer 433. (FIG. 5e.)

Figure 5F:

The image signals transmitted from the frame memories 410, 431 and 435 and the divider 437 of the averaging interpolation part 432 to the multiplexer 433 are selected and transmitted under the control of the pixel area classification part 442. (FIG. 5f.)

The process for controlling the multiplexer 433 to select and transmit one of the applied image signals is explained hereinafter.

The DFD signals summed up in macroblock units transmitted from the latch 402 of the frame ratio conversion part 400 to the comparator is compared with a critical value preset to determine the areas as motion compensation areas. The motion information received from the latch 403 of the frame ratio conversion part 400 is divided by 2 by the divider 420 in order to compute the average motion information between two frames.

The macroblock type information transmitted from the latch 404 of the frame ratio conversion part 400 together with the signals transmitted from the comparator 441 and the divider 420 to the pixel area classification part 442 are used for interpolation after being classified into still areas, motion compensation areas, covered areas, and uncovered areas by pixels at the pixel area classification 442.

If the DFD signals in macroblock units transmitted from the latch 402 are greater than the critical value, the area is determined to be an uncovered area unconditionally at the pixel area classification part 442 irrespective of the macroblock type information. The multiplexer 433 is then controlled to transmit corresponding image signals after selecting the corresponding image signals from the front frame (the (n)th frame) received from the frame memory 431.

If the DFD signals in macroblock units transmitted from the latch 402 are smaller than or equal to the critical value and the macroblock type information is detected to have been coded in intraframe coding, it is determined to be an uncovered area at the pixel area classification part 442. The multiplexer 443 is then controlled to transmit a corresponding signal after selecting the corresponding image signal from the front frame (the (n)th frame) received from the frame memory 431.

If the DFD signals in the macroblock units transmitted from the latch 402 are smaller than or equal to the critical value and the macroblock type information is determined to have been coded in motion compensated coding, it is determined that it is a covered area or a motion compensation area at the pixel area classification part 442. The multiplexer 433 is controlled to transmit a corresponding image signal after selecting the corresponding image signal either from the next frame (the (n+1)th frame) received from the frame memory 410 or from the motion compensation frame received from the frame memory 435.

If the DFD signals in macroblock units transmitted from the latch 402 are smaller than or the equal to the critical value and the macroblock type information is determined to have been coded in non motion compensated intraframe coding, it is determined that it is a still area, the multiplexer 433 is controlled to transmit an image signal after selecting the image signal from the average value of corresponding pixels from the front and rear frames (the (n)th and (n+1)th frames) received from the averaging interpolation part 432. In this instance, if corresponding pixels are determined to be a still area at the pixel area classification part 442, the multiplexer 433 is controlled to transmit after selecting from either the front frame (the (n)th frame) or the rear frame (the (n+1)th frame).

Figure 5G:
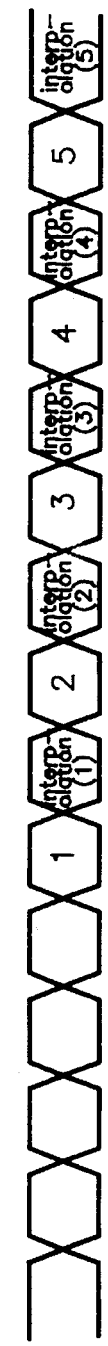

The image signals transmitted from the frame memory 410 and the multiplexer 433 are stored temporarily in the frame memories 450 and 460 to achieve synchronization, and are selected and transmitted from the multiplexer 470 under the control of the scene change detection part 443. (FIG. 5g.)

The signals transmitted from the comparator 441, summed by the summer 444 in frame units, are compared with a critical value preset to determine the signal to be a scene change by the comparator 445. The signals are delay compensated to match synchronization by the delay compensator 446, and the multiplexer 470 selects an output.

If the signal received from the summer 444 is found to be greater than the critical value as the result of comparison by the comparator 445, it is determined that the scene has been changed. The multiplexer 470 is then controlled to select and transmit an image signal of the next frame (the (n+1)th frame) received from the frame memory 450. If the signal received from the summer 444 is found to be smaller than or the same as the critical value as the result of a comparison by the comparator 445, it is determined that the scene has not been changed. The multiplexer 470 is controlled to select and transmit the image signals received from the frame memories 450 and 460, alternatively. (FIG. 5g.)

The multiplexer 470 finally transmits an image signal corresponding to two times of the frame ratio of the received image signals to facilitate a display on a monitor.

Details of the pixel area classification part 442 of the interpolation control part 440 are explained hereinafter, referring to FIG. 6.

Figure 6:
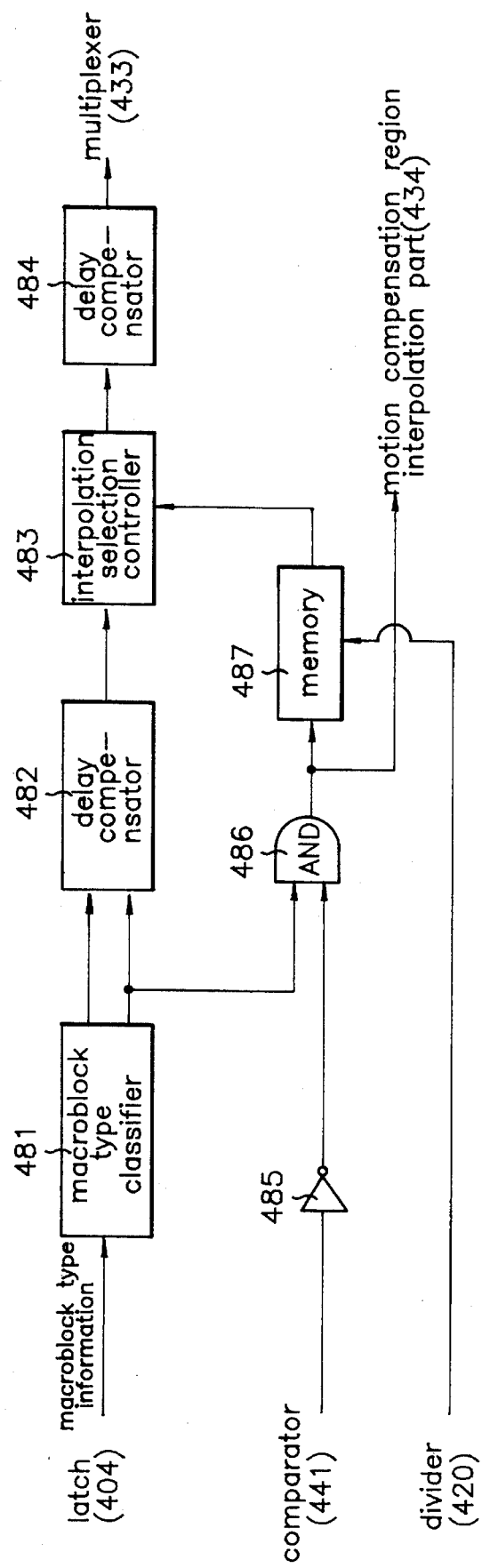
FIG. 6 shows details of the pixel area classification part of FIG. 4.

As shown in FIG. 6, the pixel area classification part 442 of the interpolation control part 440 includes a macroblock type classifier 481 for classifying the macroblock type information received from the latch 404 of the frame ratio conversion part 400 into intraframe information and motion compensation information. An inverter 485 inverts signals received from the comparator 441 of the interpolation control part 440. An AND gate 486 determines a motion compensation area by logic multiplying the signals received from the inverter 485 and the motion compensation information received from the macroblock type classifier 481, and for transmits the motion compensation area to the motion compensation region interpolation part 434.

A memory 487 stores the position of the corresponding pixel using signals received from the divider 420 in response to the signal received from the AND gate 486. A delay compensator 482 compensates for delays by storing signals received from the macroblock type classifier 481. An interpolation selection controller 483 controls the multiplexer 433 in response to the signals stored in the memory 487 and received from the delay compensator 482. A delay compensator 484 compensates for delays by storing the signals received from the interpolation selection controller 484 and transmits the delay compensated signals to the multiplexer 433.

The macroblock type information received from the latch 404 is, after being classified into intraframe information and motion compensation information at the macroblock type classifier 481, temporarily stored in the delay compensator 484. In this instance, since the intraframe information and the motion interpolation information classified at and received from the macroblock type classifier 481 shows that whether the corresponding pixel has been coded in intraframe coding, motion compensated coding, or non motion compensated intraframe coding, if it is found that the corresponding pixel has been coded in intraframe coding, the pixel is determined to be an uncovered area. If it is found that the corresponding pixel has been coded in motion compensated coding, the pixel is determined to be either a covered area or a motion compensated area. It is found that the corresponding pixel has been coded in non motion compensated intraframe coding, the pixel is determined to be a still area.

In this instance, if the corresponding pixel has been coded in motion compensated coding, in order to classify the corresponding pixel into a covered area and a motion compensated area, the output of the comparator 485 is utilized, which process is explained below.

The signals received from the comparator 441 are transmitted after being inverted by the inverter 485, and then logic multiplied by the AND gate 486 together with motion compensated information received from the macroblock type classifier 481. The signals received from the AND gate 486, which comprise signals indicating that the corresponding pixels have been interpolated through motion compensation, do not actuate the motion compensation region interpolation part 434 in case the signals show that the corresponding pixels have not been motion compensated, but actuate the motion compensation region interpolation part 434 only in case the signals show that the corresponding pixels have been motion compensated.

Data indicating motion compensated position within a frame received from the divider 420 in response to the signals received from the AND gate 486 are stored in the memory 487. That is, in case the signals received from the AND gate 486 indicate that the corresponding pixels have been motion compensated, the motion compensated position within a frame is stored into the memory 487 using the motion information divided by 2 received from the divider 420, and in case the signals received from the AND gate 486 indicate that the corresponding pixels have not been motion compensated, the memory 487 is not actuated.

The interpolation selection controller 483 classifies the corresponding pixels into covered areas and motion compensated areas in case the delay compensated signals at the delay compensator 482 show that the corresponding pixels have been written in motion compensated coding. That is, if the corresponding pixels correspond to the motion compensated positions stored in the memory 487, it is determined that the corresponding pixels comprise a motion compensated area. The interpolation selection controller 483 controls the multiplexer 433 to select and transmit the image signals stored in the frame memory 435 in order to generate motion compensated image signals. If the corresponding pixels do not correspond to the motion compensated positions stored in the memory 487, it is determined that the corresponding pixels comprise a covered area. The interpolation selection controller 483 controls the multiplexer 433 to select and transmit the image signals stored in the frame memory 410 to select corresponding image signals from the rear frame (the (n+1)th frame).

In another words, the interpolation selection controller 483 transmits signals for controlling the multiplexer 433 based on classifying pixels representing an uncovered area, a still area, and a covered area or a motion compensated area based on signals received from the delay compensator 482, and further based on classifying into a covered area and a motion compensated area based on signals stored in the memory 487.

The interpolation selection controller 483 controls the multiplexer 433 to select the output of (1) the divider 437 in order to interpolate with the average of both frames in case the signals received from the delay compensator 482 show that the corresponding pixels represent a still area, (2) the frame memory 435 in order to interpolate through motion compensation in case the signals received from the delay compensator 482 and the memory 487 show that the corresponding pixels represent a motion compensated area, (3) the frame memory 410 in order to interpolate using the image signals of a rear frame (the (n+1)th frame) in case the signals received from the delay compensator 482 and the memory 487 show that the corresponding pixels represent a covered area, and (4) the frame memory 431 in order to interpolate using the image signals of the front frame (the (n)th frame) in case the signals received from the delay compensator 482 indicate that the corresponding pixels represent an uncovered area.

Further, the interpolation selection controller 483 may control the multiplexer 433 either to select the output of the frame memory 431 in order to interpolate using the image signals of the front frame (the (n)th frame), or the output of the frame memory 410 in order to interpolate using the image signals of the rear frame (the (n+1)th frame) in case the signals received from the delay compensator 482 show that the corresponding pixels represent a still area. The signals received from the interpolation selection controller 483 are stored in the delay compensator 484, and applied to the multiplexer 433 in order to control the multiplexer 433.

Another embodiment of the frame ratio conversion part 400 will be explained with reference to FIG. 7.

Figure 7:
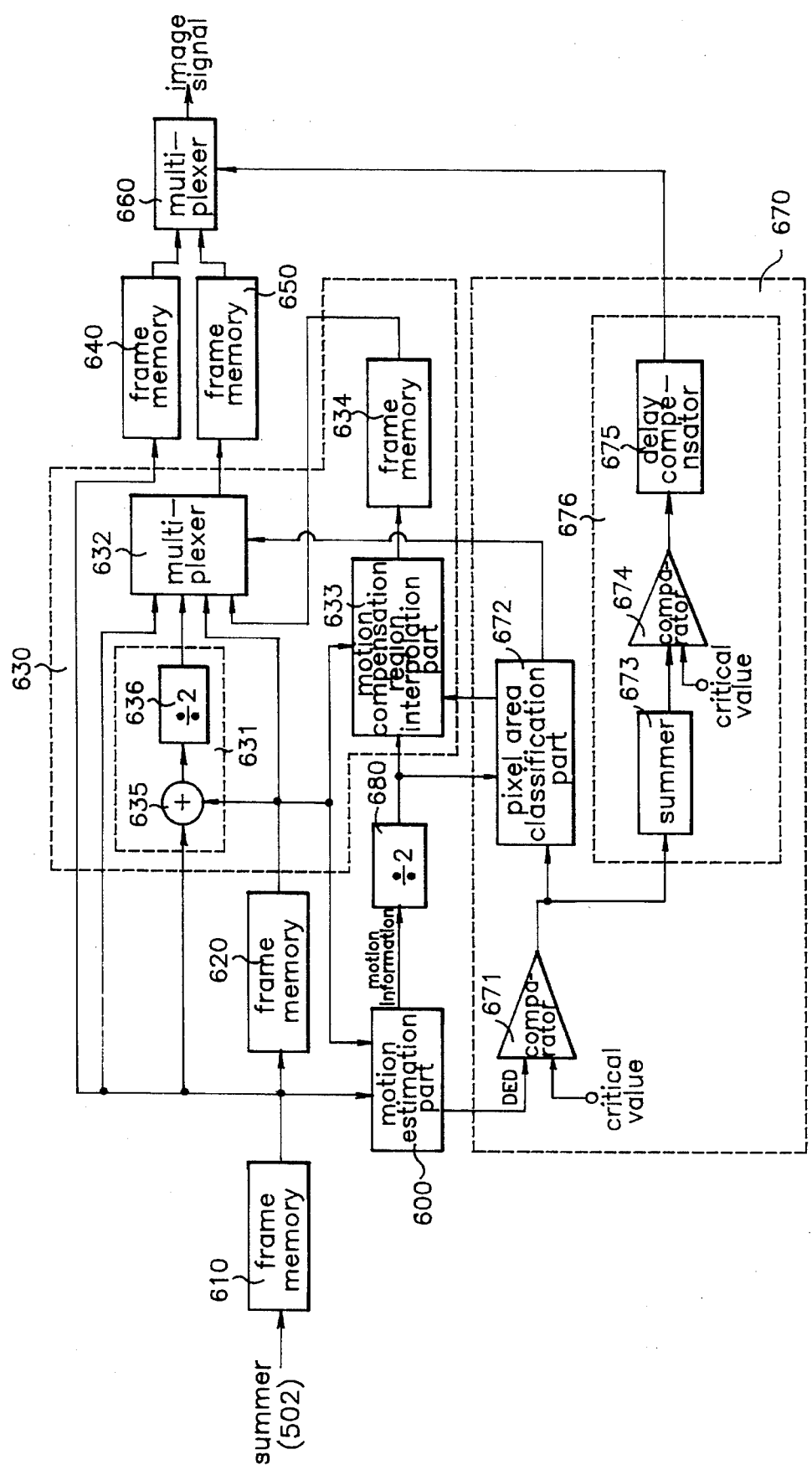
FIG. 7 shows details of another embodiment of the frame ratio conversion part of the device of FIG. 1.

As shown in FIG. 7, another embodiment of the frame ratio conversion part 400 includes frame memories 610 and 620 connected in series for storing the image signals in frame units received from the motion compensator 500 and a motion estimation part 600 for estimating motion information and DFD signals using image signals of two adjoining frames received from the frame memories 610 and 620. A divider 680 divides the motion information received from the motion estimation part 600 by 2, and an interpolation control part 670 classifies areas by pixels using the motion information received from the motion estimation part 600 and the signals received from the divider 680. An interpolation part 630 completes one frame by carrying out interpolation using the image signals received from the frame memories 610 and 620 and the signals received from the divider 680 under the control of the interpolation control part 670. A frame memory 640 stores the image signals received from the frame memory 610 temporarily to achieve synchronization and a frame memory 650 stores the image signals received from the interpolation part 630 temporarily to achieve synchronization. A multiplexer 660 selects and transmits one of the image signals received from the frame memories 640 and 650 under the control of the interpolation control part 670. In this manner, the frame ratios of the image signals received from the motion compensation part 500 can be converted based on areas classified into still areas, motion compensated areas, covered areas, and uncovered areas, classified by pixels through estimation of the motion information and the DFD signals using the image signals of two adjoining frames received from the motion compensation part 500. Alternatively, the frame memory 640 and 650 can be removed to permit the multiplexer 660 to select and transmit directly one of the signals received from the frame memory 610 and the interpolation part 630.

The interpolation control part 670 includes a comparator 671 for comparing the DFD signals received from the motion estimation part 600 to a preset critical value. A pixel area classification part 672 controls the interpolation part 630 by identifying still areas, motion compensated areas, covered areas and uncovered areas, according to corresponding pixels using signals received from the divider 680 and the comparator 671. A scene change detection part 676 detects changes of scenes using signals received from the comparator 671 control the output of the multiplexer 660.

The scene change detection part 676 includes a summer 673 for summing signals received from the comparator 671 in frame units. A comparator 674 compares the signals received from the summer 673, and a delay compensator 675 compensates for delays by storing signals received from the comparator 674 temporarily, and by controlling the output of the multiplexer 660.

The interpolation part 630 includes an averaging interpolation part 631 for carrying out interpolation with the average of both frames using the image signals received from the frame memories 610 and 620. A motion compensation region interpolation part 633 performs motion compensation using signals received from the frame memory 620 and the divider 680 according to the control of the pixel area classification part 672. A frame memory 634 stores signals received from the motion compensation region interpolation part 633, and a multiplexer 632 selects the signals received from the frame memories 610, 620 and 634, and the averaging interpolation part 631, and transmits the selected signals under the control of the pixel area classification part 633.

The operation of the frame ratio conversion part having the foregoing embodiment is explained hereinafter.

The image signals received from the adder 502 of the motion compensation part 500 are stored in the frame memory 610 in frame units, and the image signals stored in the frame memory 610 in frame units are again stored in the frame memory 620. The image signals stored in the frame memories 610 and 620 in frame units are for two adjoining frames, i.e., for front and rear frames (the (n+1)th and (n)th frames).

The image signals in frame units transmitted from the frame memories 610 and 620 to the motion estimation part 600 are estimated and detected on motion information and DFD signals in macroblock units. The motion information transmitted from the motion estimation part 600 is divided by 2 in the divider 680 to provide an average motion value between two frames, and transmitted to the motion compensation region interpolation part 634 and the pixel area classification part 672.

The average motion information received from the divider 680 is used for carrying out motion compensation of the image signals received from the frame memory 620 at the motion compensation region interpolation part 633 according to the control of the pixel area classification part 672. The image signals that have been motion compensated by the motion compensation region interpolation part 633 are stored in the frame memory 634 temporarily and then transmitted to the multiplexer 632.

The image signals stored in the frame memories 610 and 620 are added up at the adder 635 and divided by 2 at the divider to provide an average for the frames. The image signals transmitted from the frame memories 610, 620 and 634 and the divider 636 of the averaging interpolation part 631 to the multiplexer 433 are selected and transmitted under the control of the pixel area classification part 672.

The process for controlling the multiplexer 632 to select and transmit one of the applied image signals is explained next.

The DFD signals in macroblock units received from the motion estimation part 600 are compared with a critical value preset to determine the areas as motion compensation areas at the comparator 671. The motion information received from the motion estimation part 600 is divided by 2 by the divider 680 to compute the average motion information between two frames.

The signals transmitted from the comparator 671 and the divider 680 to the pixel area classification part 672 are used for interpolation by classifying them into still areas, motion compensated areas, covered areas and uncovered areas according to the values of corresponding pixels. That is, if the DFD signals in macroblock units received from the motion estimation part 600 is greater than the critical value to detect an uncovered area by the pixel area classification part 672, the multiplexer 632 is controlled to select a corresponding image signal from the front frame (the (n)th frame) received from the frame memory 620 and to transmit the selected corresponding image signal.

If the DFD signals in macroblock units transmitted from the motion estimation part 600 are less than or equal to the critical value, it is determined that it is an uncovered area, a motion compensated area, a covered area, or a still area by the pixel area classification part 672. Depending on the average motion information, the multiplexer 632 is controlled to select (1) a corresponding image signal from the front frame (the (n)th frame) received from the frame memory 620, (2) a corresponding signal from the motion compensated frame received from the frame memory 633, (3) a corresponding image signal from the rear frame (the (n+1)th frame) received from the frame memory 610, and (4) the image signals by the average value of the corresponding pixels of the front and rear frames (the (n)th and (n+1)th frames), and to transmit the selected image signals.

In another words, the pixel area classification part 672 controls the multiplexer 632 to interpolate, with the average between two frames when the corresponding pixel is determined to be a still area, through motion compensation when the corresponding pixel is determined to be a motion compensated area, using an image signal of the rear frame (the (n+1)th frame) when the corresponding pixel is determined to be a covered area, and using image signal of the front frame (the (n)th frame) when the corresponding pixel is determined to be an uncovered area. In this instance, if corresponding pixel is determined to be a still area by the pixel area classification part 672, the multiplexer 632 is controlled to transmit a corresponding image signal after selecting the corresponding image signal from either the front frame (the (n)th frame) or the rear frame (the (n+1)th frame).

The image signals received from the frame memory 610 and the multiplexer 632 are stored temporarily in the frame memories 640 and 650, respectively, to match synchronization, and selected and transmitted from the multiplexer 660 under the control of the scene change detection part 676.

The signals received from the comparator 671, are summed up by the summer 673 in frame units, compared with a preset critical value to determine a scene change by the comparator 674, delay compensated to match synchronization by the delay compensator 675, and used to control the multiplexer 660 to select an output.

If the signals received from the summer 673 are found to be greater than the critical value as the result of comparison by the comparator 674, it is determined that the scene has changed, and the multiplexer 660 is controlled to select and transmit an image signal of the rear frame (the (n+1)th frame) received from the frame memory 640. If the signals received from the summer 673 are found to be less than or equal to the critical value as the result of comparison by the comparator 674, it is determined that the scene has been changed, and the multiplexer 660 is controlled to select and transmit the image signals received from the frame memories 640 and 650, alternatively.

The multiplexer 660 then transmits image signals corresponding to twice the frame ratio of the applied image signals to facilitate a display on a monitor.

At present, the frame ratios or field ratios of HDTV existing worldwide are 50 Hz, 60 Hz and 59.94 Hz, a need can arise to convert image signals with 60 Hz frame ratios into image signals with 59.94 Hz frame ratios.

To do this, a frame ratio conversion device can be provided which further includes a frame ratio conversion part 700 that can convert image signals with 60 Hz frame ratios received from the frame ratio conversion part 400 into image signals with 59.94 Hz frame ratios.

Figure 8:
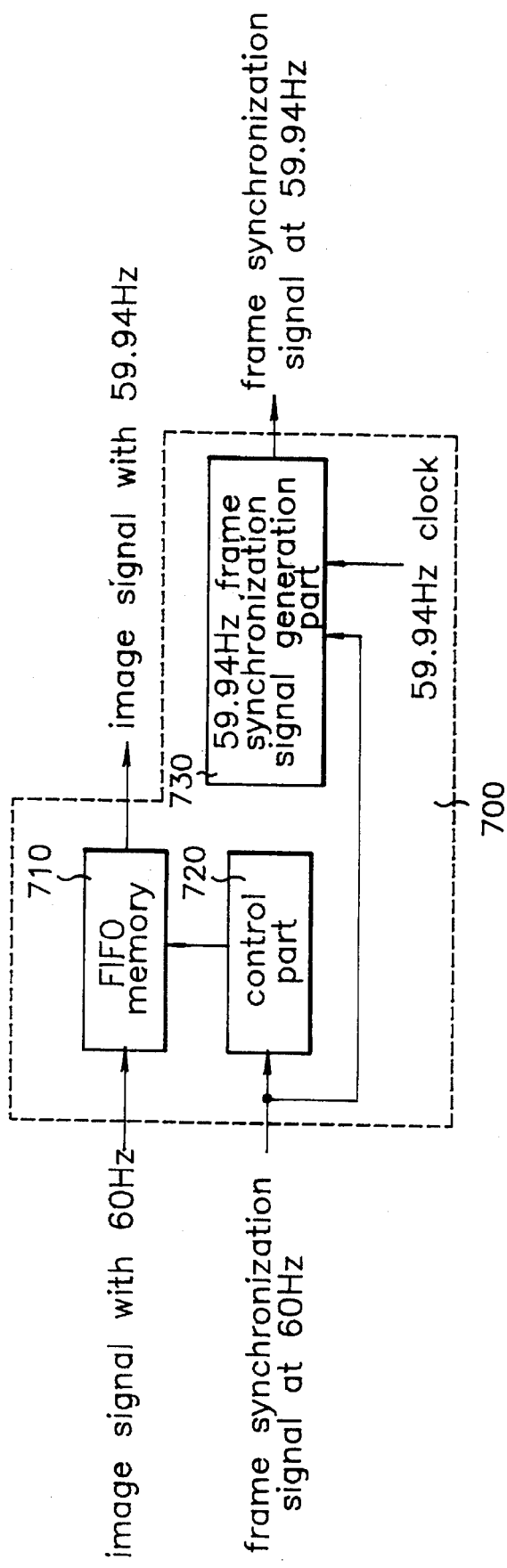
FIG. 8 shows details of a 60 Hz/59.94 Hz frame ratio conversion device.

As shown in FIG. 8, the frame ratio conversion part 700 includes a FIFO memory 710 for storing and transmitting one frame of image signals with 60 Hz frame ratio received from the frame ratio conversion part 400, a control part 720 for controlling the FIFO memory 710 using frame synchronization signals at 60 Hz, and a 59.94 Hz frame synchronization signal generation part 730 for generating frame synchronization signals at 59.94 Hz using 60 Hz frame synchronization signals and a 59.94 Hz clock.

To convert image signals with 60 Hz frame ratios into image signals with 59.94 Hz frame ratios, every 1000 frames should be converted into 999 frames, and the simplest method is to remove every 1000th incoming frame. Of every incoming 1000 frames, only 999 frames should be read and one frame should not be read. In another words, if 1000 frames of image signals with 60 Hz frame ratios are received, 999 frames are read to leave the 1000th frame in the FIFO memory 710 when the FIFO memory 710 is reset again. This makes the transmitted frame ratio 59.94 Hz.

Details of the foregoing process are explained below.

Image signals with 60 Hz frame ratios are stored in the FIFO memory 710 frame by frame, and transmitted therefrom as image signals with a 59.94 Hz frame ratio under the control of the control part 720.

The 60 Hz frame synchronization signals, applied to the control part 720, are used to control the FIFO memory 710 to transmit image signals with a 59.94 Hz frame ratio. That is, the control part 720, receiving 60 Hz frame synchronization signals, controls the FIFO memory 710 to not transmit the image signals corresponding to the 1000th frame of the image signals applied therein by resetting the FIFO memory 710 at 1000th frame synchronization.

In other words, the incoming image signals with a 60 Hz frame ratio are stored in the FIFO memory 710 successively, and transmitted until the image signals corresponding to the 999th frame are transmitted under the control of the control part 720. When the 1000th frame synchronization signal is received, the control part 720 resets the FIFO memory 710 to prevent transmission of the image signals corresponding to the last, i.e., the 1000th, frame stored in the FIFO memory 710. The FIFO memory 710 with the image signals corresponding to the 1000th frame stored therein is reset and begins to transmit again starting from the image signals corresponding to the first frame. To retain synchronization, the 60 Hz frame synchronization signals together with 59.94 Hz clock signals are applied to the 59.94 Hz frame synchronization signal generation part 730 to generate 59.94 Hz frame synchronization signals.

Details of the control part 720 will now be explained with reference to FIG. 9.

Figure 9:
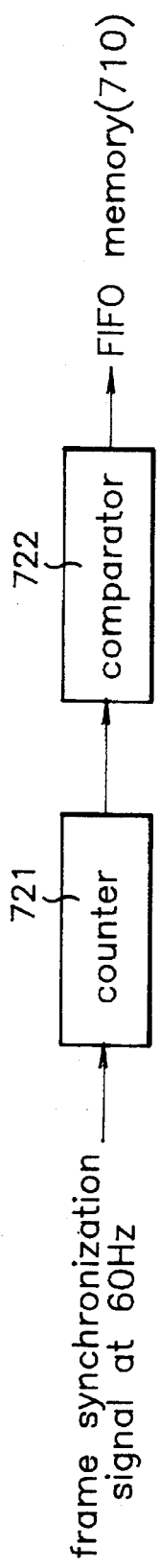
FIG. 9 shows details of the control part of FIG. 8.

As shown in FIG. 9, the control part 720 includes a counter 721 for counting 60 Hz frame synchronization signals applied thereto, and a comparator 722 for comparing the counted value received from the counter 721 to 1000 for controlling the FIFO memory 710. The counter 721 is provided with a 10 bit counter capable of counting up to 1000.

The 60 Hz frame synchronization signal is reset every time the 1000th frame synchronization signal counted at the counter 721 is applied thereto. The signals transmitted from the counter 721 are compared to 1000, and the result of the comparison is transmitted as the control signals for the FIFO memory 710. That is, if the output of the counter 721 is not 1000, the comparator 722 is controlled to transmit a low level signal to the FIFO memory 710 to carry out writing and reading, and if the output of the counter 721 is 1000, the comparator 722 is controlled to transmit a high level signal to reset the FIFO memory 710 and prevent the FIFO memory 710 from reading the image signal corresponding to the 1000th frame. In this manner, image signals with a 60 Hz frame ratio can be converted into image signals with a 59.94 Hz frame ratio.

At present, since the frame ratios or field ratios of an HDTV existing worldwide are 50 Hz, 60 Hz and 59.94 Hz, in some situations image signals with a 59.94 Hz frame ratio must be converted into image signals with a 60 Hz frame ratio.

To do this, a frame ratio conversion device can be provided which further includes a frame ratio conversion part 800 that can convert image signals with a 59.94 Hz frame ratio transmitted from the frame ratio conversion part 400 into image signals with a 60 Hz frame ratio.

Figure 10:
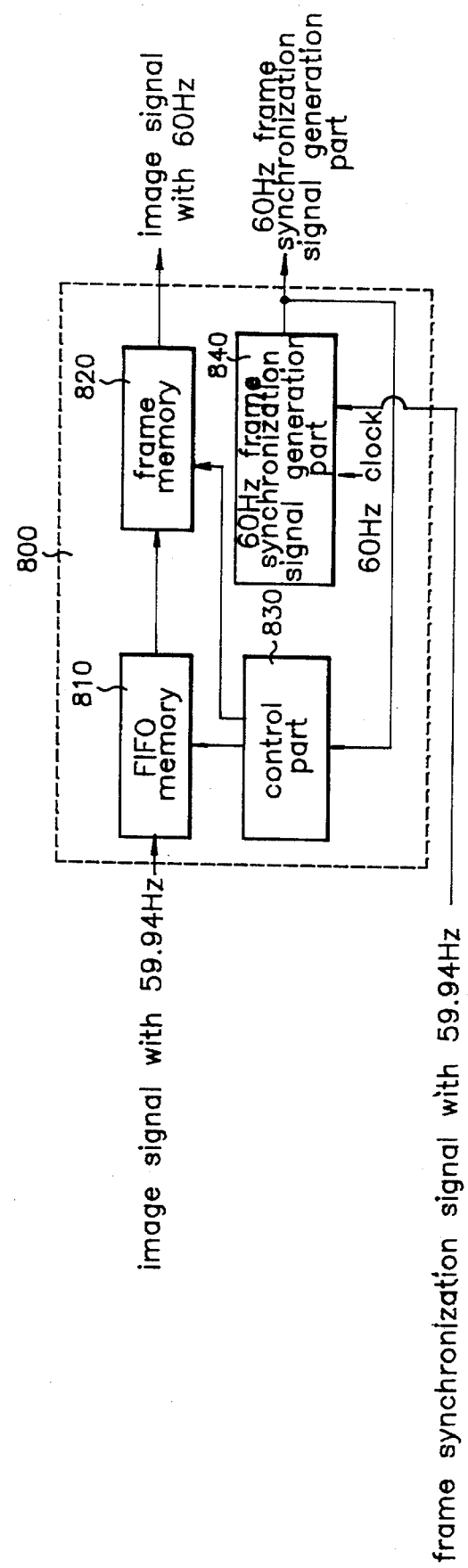
FIG. 10 shows details of a 59.94 Hz/60 Hz frame ratio conversion part.

As shown in FIG. 10, the frame ratio conversion part 800 includes a FIFO memory 810 for temporarily storing and transmitting one frame of image signals with a 59.94 Hz frame ratio received from the frame ratio conversion part 400. A frame memory 820 for stores one frame of image signals received from the FIFO memory 810 and transmits image signals with a 60 Hz frame ratio. A 60 Hz frame synchronization signal generation part 840 generates frame synchronization signals at 60 Hz using 59.94 Hz frame synchronization signals and a 60 Hz clock. A control part 830 controls the FIFO memory 810 and the frame memory 820 using frame synchronization signals at 60 Hz received from the 60 Hz frame synchronization signal generation part 840. The FIFO memory 810 should be at least capable of storing image signals corresponding to one frame.

To convert image signals with a 59.94 Hz frame ratio into image signals with a 60 Hz frame ratio, every 999 frames should be converted into 1000 frames. One method to do this is to repeat transmitting every 999th incoming frame. That is, after completion of reading in the incoming 999 frames, the 999th frame should be read again.

Further details of the foregoing process will be explained below.

The image signals with a 59.94 Hz frame ratio read and stored in the FIFO memory 810 frame by frame under the control of the control part 830 are written in the frame memory 820 again, and transmitted therefrom as image signals with a 60 Hz frame ratio under the control of the control part 830.

To match synchronization, the 59.94 Hz frame synchronization signals and 60 Hz clock signals applied to the 60 Hz frame synchronization signal generation part 840 are transmitted as 60 Hz frame synchronization signals. The 60 Hz frame synchronization signals transmitted from the 60 Hz frame synchronization signal generation part 840 to the control part 830 are used to control the FIFO memory 810 and the frame memory 820 to transmit image signals with a 60 Hz frame ratio. That is, upon receiving 60 Hz frame synchronization signals, the control part 830 controls the FIFO memory 810 to read in the image signals corresponding to each frame from each synchronization and to transmit the read in image signals. The control part 830, after reading in the image signals corresponding to each of the 999th frames from each of the 999th frame synchronizations stored in the FIFO memory 810, holds the FIFO memory 810 reading and the frame memory 820 writing for ⅟60 second, and continues the FIFO memory 810 writing and the frame memory 820 reading. This operation prevents the FIFO memory 810 from underflowing and causes the frame memory 820 to repeat reading in each of the 999th frames once more after every 999 frames.

Details of the control part 830 are explained hereinafter by referring to FIG. 11.

Figure 11:
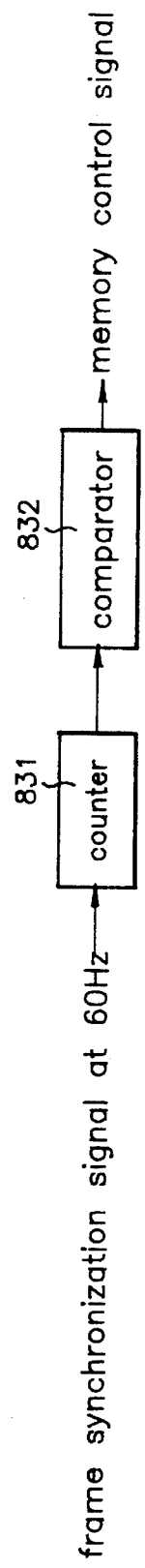
FIG. 11 shows details of the control part of FIG. 10.

As shown in FIG. 11, the control part 830 includes a counter 831 for receiving and counting the 60 Hz frame synchronization signals transmitted from the 60 Hz frame synchronization signal generation part 840. A comparator 832 compares the counted value of the counter 831 to 999 to control the FIFO memory 810 and frame memory 820. The counter 831 may be a 10 bit counter capable of counting up to 1000.

The 60 Hz frame synchronization signal received from the 60 Hz frame synchronization signal generation part 840 is reset every time the 999th frame synchronization signal counted by the counter 831 is applied thereto. The signals received from the counter 831 are compared to 999 by the comparator 832, and the result of the comparison is applied as control signals to the FIFO memory 810 and the frame memory 820. That is, if the output of the counter 831 is not 999, the signals applied from the comparator 832 controls the FIFO memory 810 and the frame memory 820 to carry out reading and writing according to the frame synchronization signals. If the output of the counter 831 is 999, the signals applied from the comparator 832, for ⅟60 second after the FIFO memory 810 is read in the 999th frame, hold the FIFO memory 810 reading and the frame memory 820 writing, and continues the FIFO memory 810 writing and the frame memory 820 reading. This permits the frame memory 820 to repeat reading the image signals corresponding to every 999th frame. In this manner, image signals with a 59.94 Hz frame ratio can be converted into image signals with a 60 Hz frame ratio.

As has been explained, this invention provides users with advantages of watching natural display picture having good picture quality by carrying out classification of the corresponding pixel areas and subsequent interpolation easily by utilizing various information applied from an image signal decoder.

Although the invention has been described in conjunction with specific embodiments, it is evident that many alternatives and variations exist which will be apparent to those skilled in the art in light of the foregoing description. Accordingly, the invention is intended to embrace all of the alternatives and variations that fall within the spirit and scope of the appended claims.

What is claimed is:

1. A device for converting image signal frame formats comprising:

a motion compensation means for restoring image signals by carrying out motion compensations employing motion information and displaced frame difference, said motion information having been variable length decoded and inverse multiplex converted and said displaced frame difference having been variable length decoded, inverse multiplex converted, inverse quantized, and inverse discrete cosine converted; and a first frame ratio conversion means for classifying areas by pixels including still areas, motion compensation areas, covered areas and uncovered areas, employing the motion information, macroblock type information, and the displaced frame difference, and for converting a frame ratio of image signals received from the motion compensation means according to the classified areas, said motion information having been variable length decoded and inverse multiplex converted, and said displaced frame difference having been variable length decoded, inverse multiplex converted, inverse quantized, and inverse discrete cosine converted.

2. A device for converting image signal frame formats comprising:

a motion compensation means for restoring image signals by carrying out motion compensations employing motion information and displaced frame difference, said motion information having been variable length decoded and inverse multiplex converted and said displaced frame difference having been variable length decoded, inverse multiplex converted, inverse quantized, and inverse discrete cosine converted; and a first frame ratio conversion means for classifying areas by pixels, employing the motion information, macroblock type information, and the displaced frame difference, and for converting a frame ratio of image signals received from the motion compensation means according to the classified areas, said motion information having been variable length decoded and inverse multiplex converted, and said displaced frame difference having been variable length decoded,inverse multiplex converted, inverse quantized, and inverse discrete cosine converted;

wherein the motion compensation means includes:

a motion compensator for compensating motion using the motion information, variable length decoded and inverse multiplex converted;

an adder for adding the displaced frame difference, variable length decoded, inverse multiplex converted, inverse quantized and inverse discrete cosine converted, and signals received from and motion compensated at the motion compensator, and for transmitting the image signals to the frame conversion means; and a frame memory for storing image signals received from the adder, and for transmitting the stored image signals to the motion compensator.

3. A device for converting image signal frame formats comprising:

a motion compensation means for restoring image signals by carrying out motion compensations employing motion information and displaced frame difference, said motion information having been variable length decoded and inverse multiplex converted and said displaced frame difference having been variable length decoded, inverse multiplex converted, inverse quantized, and inverse discrete cosine converted; and a first frame ratio conversion means for classifying areas by pixels, employing the motion information, macroblock type information, and the displaced frame difference, and for converting a frame ratio of image signals received from the motion compensation means according to the classified areas, said motion information having been variable length decoded and inverse multiplex converted, and said displaced frame difference having been variable length decoded,inverse multiplex converted, inverse quantized, and inverse discrete cosine converted;

wherein the first frame ratio conversion means includes:

a summer for summing the displaced frame difference, variable length decoded, inverse multiplexed converted, inverse quantized and inverse discrete cosine converted, in macroblock units;

a first latch for temporarily storing the displaced frame difference received from the summer in macroblock units;

a second latch for temporarily storing the motion information, variable length decoded and inverse multiplex converted, in order to compensate for delay introduced by the summer;

a third latch for temporarily storing macroblock type information having been variable length decoded and inverse multiplex converted in order to compensate for delay introduced by the summer; and a frame ratio converter for converting frame ratios by completing one frame through classifying areas by pixels utilizing the image signals received from the motion compensation means and signals received from the first, second, and third latches, and for carrying out corresponding interpolations according to the result of the classification.

4. A device as claimed in claim 3, wherein the frame ratio converter includes:

a first frame memory for storing image signals received from the motion compensation means;

a first divider for dividing the motion information received from the second latch by 2;

an interpolation control means for classifying areas by pixels using signals received from the first and the third latches and the first divider;

an interpolation means for carrying out interpolation to complete one frame using image signals received from the first frame memory and signals received from the first divider under the control of the compensation control means; and a first multiplexer for selecting and transmitting one of the image signals received from the first frame memory and the interpolation means under the control of the compensation control means.

5. A device as claimed in claim 4, further including a third frame memory for temporarily storing image signals received from the first frame memory to match synchronization, and a fourth frame memory for temporarily storing image signals received from the interpolation means to match synchronization.

6. A device as claimed in claim 4, further including a second frame memory for temporarily storing the image signals received from the first frame memory to match synchronization, and a third frame memory for temporarily storing of the image signals received from the interpolation means to match synchronization.

7. A device as claimed in claim 4, wherein the interpolation control means includes:

a first comparator for comparing the displaced frame difference received from the first latch to a first preset critical value;

a pixel area classification means for controlling the interpolation means by classifying the area by pixels using signals received from the first divider, the third latch, and the first comparator; and a scene change detection means for controlling the output of the first multiplexer by detecting changes of scenes using signals received from the first comparator.

8. The device as claimed in claim 7, wherein the scene change detection means includes:

a second summer for summing signals received from the first comparator in frame units;

a second comparator for comparing the signals received from the second summer to a second preset value; and a first delay compensator for compensating delays by storing signals received from the second comparator temporarily, and for controlling the output of the first multiplexer.

9. A device as claimed in claim 7, wherein the interpolation means includes:

a second frame memory for storing the image signals received from the first frame memory;

an averaging interpolation means for carrying out interpolation with the average of two frames using the image signals received from the first and second frame memories;

a motion compensation region interpolation means for carrying out motion compensation using signals received from the second frame memory and the second divider under the control of the pixel area classification means;

a third frame memory for storing signals received from the motion compensation region interpolation means; and a second multiplexer for selecting and transmitting signals received from the first, second, and third frame memories and the averaging interpolation means under the control of the pixel area classification means.

10. The device as claimed in claim 9, wherein the pixel area classification means classifies the area into still areas, motion compensation areas, covered areas, and uncovered areas classified by pixels.

11. A device as claimed in claim 9, wherein the averaging interpolation means includes an adder for adding the image signals received from the first and second frame memories and a second divider for dividing signals received from the adder by 2.

12. A device as claimed in claim 10, wherein the pixel area classification means includes:

a macroblock type classifier for classifying macroblock type information received from the third latch into intraframe information and motion compensation information;

an inverter for inverting signals received from the first comparator;

an AND gate for detecting a motion compensation area by logic multiplying of the signals received from the inverter and the motion compensation information received from the macroblock type classifier, and for transmitting the motion compensation area to the motion compensation region interpolation means;

a memory for storing the position of the corresponding pixel using signals received from the first divider in response to the signal received from the AND gate;

a second delay compensator for compensating delays by storing signals received from the macroblock type classifier;

an interpolation selection controller for controlling the second multiplexer in response to the signals stored in the memory and the signals received from the second delay compensator; and a third delay compensator for compensating delays by storing the signals received from the interpolation selection controller and transmitting the delay compensated signals to the second multiplexer.

13. A device as claimed in claim 12, wherein the interpolation selection controller controls the second multiplexer to interpolate with the average of both frames in case the signals received from the second delay compensator indicate the corresponding pixel is a still area, to interpolate through motion compensation in case the signals received from the second delay compensator and the memory show that the corresponding pixel is in the motion compensation area, to interpolate using the image signals of rear frame (n+1)th in case the signals received from the second delay compensator and the memory show that the corresponding pixel is in the covered area, and to interpolate using the image signals of a front frame in case the signals received from the second delay compensator show that the corresponding pixel is in the uncovered area.

14. A device as claimed in claim 13, wherein the interpolation selection controller controls the second multiplexer to interpolate using the image signals of the front frame in case the signals received from the second delay compensator show that the corresponding pixel is in the still area.

15. A device as claimed in claim 13, wherein the interpolation selection controller controls the second multiplexer to interpolate using the image signals of a rear frame in case the signals received from the second delay compensator show that the corresponding pixel is in the still area.

16. A device as claimed in claim 1, wherein the first frame ratio conversion means classifies the area by pixels through estimating the motion information and the displaced frame difference using image signals of two adjoining frames received from the motion compensation means, and converts the frame ratio of image signals received from the motion compensation means according to the classified areas.

17. A device as claimed in claim 1, wherein the frame ratio conversion means includes:

the first and the second frame memories connected in series for storing the image signals in frame units received from the motion compensator;

a motion estimation device for estimating motion information and displaced frame difference using image signals of two adjoining frames received from the first and the second frame memories;

a first divider for dividing the motion information received from the motion estimation means by 2;

an interpolation control means for classifying areas by pixels using the motion information received from the motion estimation means and the signals received from the first divider;

an interpolation means for completing one frame by carrying out interpolation using the image signals received from the first and the second frame memories and the signals received from the first divider under the control of the interpolation control means; and a first multiplexer for selecting and transmitting one of the image signals received from the first frame memory and the interpolation means under the control of the interpolation control means.

18. A device as claimed in claim 17, wherein the interpolation control means includes:

a first comparator for comparing the displaced frame difference received from the motion estimation means to a first critical value;

a pixel area classification means for controlling the interpolation means through classifying the areas by pixels using signals received from the first divider and the comparator; and a scene change detection means for detecting changes of scenes using signals received from the first comparator for controlling output of the first multiplexer.

19. A device as claimed in claim 18, wherein the scene change detection means includes:

a summer for summing signals received from the first comparator in frame units;

a second comparator for comparing the signals received from the summer to a second preset value; and a first delay compensator for compensating delays by storing signals received from the second comparator temporarily, and for controlling the output of the first multiplexer.

20. The device as claimed in claim 18, wherein the interpolation means includes:

an averaging interpolation means for carrying out interpolation with the average of two frames using the image signals received from the first and second frame memories;

a motion compensation region interpolation means for carrying out motion compensation using signals received from the second frame memory and the second divider under the control of the pixel area classification means;

a fourth frame memory for storing signals received from the motion compensation region interpolation means; and a second multiplexer for selecting and transmitting signals received from the first, second and third frame memories and the averaging interpolation means under the control of the pixel area classification means.

21. A device as claimed in claim 20, wherein the averaging interpolation means includes an adder for adding the image signals received from the first and second frame memories and a second divider for dividing signals received from the adder by 2.

22. A device as claimed in claim 20, wherein the pixel area classification means controls the second multiplexer to interpolate with the average of both frames in case the corresponding pixel is determined to be in the still area, to interpolate through motion compensation in case the corresponding pixel is determined to be in the motion compensation area, to interpolate using the image signals of rear frame in case the corresponding pixel is determined to be a covered area, and to interpolate using the image signals of the front frame in case the corresponding pixel is determined to be in the uncovered area.

23. A device as claimed in claim 22, wherein the pixel area classification means controls the second multiplexer to interpolate using the image signals of a front frame in case the corresponding pixel is determined to be in the still area.

24. A device as claimed in claim 22, wherein the pixel area classification means controls the second multiplexer to interpolate using the image signals of a rear frame in case the corresponding pixel is determined to be in the still area.

25. A device as claimed in claim 4, further including a second frame ratio conversion means for converting image signals with a 60 Hz frame ratio received from the first frame ratio conversion means into image signals with a 59.94 Hz frame ratio.

26. A device as claimed in claim 25, wherein the second frame ratio conversion means includes:

a FIFO memory for storing and transmitting one frame of the image signals with a 60 Hz frame ratio received from the first frame ratio conversion means;

a control means for controlling the FIFO memory using a frame synchronization signal at 60 Hz; and a 59.94 Hz frame synchronization signal generation means for generating frame synchronization signals at 59.94 Hz using 60 Hz frame synchronization signals and 59.94 Hz clock signals.

27. A device as claimed in claim 26, wherein the control means includes:

a counter for counting the 60 Hz frame synchronization signals applied thereto; and a comparator for comparing the counted value received from the counter to 1000 for controlling the FIFO memory.

28. A device as claimed in claim 27, wherein the counter is a 10 bit counter.

29. A device as claimed in claim 1, further including a second frame ratio conversion means for converting image signals with a 59.94 Hz frame ratio received from the first frame ratio conversion means into image signals with a 60 Hz frame ratio.

30. A device as claimed in claim 29, wherein the second frame ratio conversion means includes:

a FIFO memory for storing temporarily and transmitting one frame of the image signals with a 59.94 Hz frame ratio received from the first frame ratio conversion means;

a frame memory for storing one frame of image signals received from the FIFO memory and for transmitting image signals at a 60 Hz frame ratio;

a 60 Hz frame synchronization signal generation means for generating frame synchronization signals at 60 Hz using 59.94 Hz frame synchronization signals and a 60 Hz clock signal; and a control means for controlling the FIFO memory and the frame memory using frame synchronization signals at 60 Hz received from the 60 Hz frame synchronization signal generation means.

31. A device as claimed in claim 30, wherein the control means includes a counter for receiving and counting the 60 Hz frame synchronization signals transmitted from the 60 HZ frame synchronization signal generation means, and a comparator for comparing the counted value received from the counter to 999 for controlling the FIFO memory and frame memory.

32. A device as claimed in claim 31, wherein the counter is a 10 bit counter.

* * * * *

UNITED STATES PATENT AND TRADEMARK OFFICE
CERTIFICATE OF CORRECTION

PATENT NO. : 5,508,747
DATED : April 16, 1996
INVENTOR(S) : Dong Ho LEE

It is certified that error appears in the above-indentified patent and that said Letters Patent is hereby corrected as shown below:

Title page, item [54] and column 1, line 4
In the Title, Line 2, after "FRAME", insert
--RATIOS--.

Signed and Sealed this

Eighteenth Day of March, 1997

*Attest:*

BRUCE LEHMAN

*Attesting Officer*     Commissioner of Patents and Trademarks